UNITED STATES PATENT OFFICE.

HENRY B. SEIDEL, OF WILMINGTON, DELAWARE.

IMPROVED PROCESS FOR TREATING ORES.

Specification forming part of Letters Patent No. 49,658, dated August 29, 1865.

*To all whom it may concern:*

Be it known that I, HENRY B. SEIDEL, of Wilmington, in the county of New Castle and State of Delaware, have made a new and useful Improvement in the Manufacture of Iron; and I do hereby declare the following to be a full, clear, and exact description of the nature of the same.

The invention consists in combining cast-iron turnings or other sufficiently small cast-iron scrap with wrought-iron scrap, or with wrought-iron scrap and turnings, to form a bloom.

To enable one skilled in the manufacture of iron to make use of my invention, I will proceed to describe it, premising that I do not claim to have made any improvement in the construction of the furnace or forge fire in which the operation I am about to describe is carried on.

The combination above referred to, of cast-iron turnings with wrought-iron scrap, may take place in a puddling-furnace, or in a forge-fire as ordinarily constructed and used by iron-workers. I prefer the latter, and will proceed to describe my improvement in that connection.

It will be understood that a forge-fire, as used in manufactories of iron, consists of a furnace in which the iron (wrought-scrap generally) is exposed to the heat of the fuel under a blast through a tuyere, for the purpose of melting it together, or aggregating it to form a "bloom" to be worked in the rolling-mill for the production of a boiler-plate or otherwise.

I will describe the operation as ordinarily conducted.

Having filled the hollow bed of the furnace with charcoal and piled the wrought-scrap upon it, which may consist in part of turnings and borings, the fire and blast are applied and the metal is gradually melted and, percolating through the mass of fuel, forms in the bed of the furnace what is technically termed a "loop" or ball of iron suitable for the hammer or squeezer, which forms it into a bloom for the rolls. The intention in this case is not, as in puddling, to effect a change in the constituent quality of the iron, but to aggregate wrought-scrap into a mass to be fashioned for future usefulness.

My invention consists in adding to wrought-scrap, or to the wrought-scrap and turnings thus under treatment in the fire, a quantity of cast-iron turnings or borings, or other sufficiently small cast-iron scrap, which said cast-iron becomes aggregated with and assimilated in its nature to the wrought-iron, forming a homogeneous mass. I consider thirty-three per cent. of cast-iron turnings as a good proportion of ordinary iron, but the quantity of cast-turnings that can be used to advantage depends upon the quality of the iron from which the turnings are made. When using cast-borings from car-wheel establishments, where superior charcoal-pig is used, I have worked in as high as forty per cent. The cost per pound of blooms thus made is materially lessened, as the cast-turnings are of much smaller value per pound than the wrought metal.

I will state the manner in which I suppose the union to take place, not holding myself responsible for the correctness of my theory, but aiming in good faith to state the facts, so that an expert may be enabled to follow my track.

I suppose that the cast-iron turnings, being the first to melt, and being in a comminuted state favorable to the action of the air and heat, adhere to the wrought-scrap and part with a portion of their carbon to the air, and perhaps in a degree to the wrought-iron, the two descriptions of iron finding their way unitedly down through the fuel and collecting in a homogeneous mass in the basin of the furnace. If cast-scrap iron of an unsuitable size be employed, it will find its way first to the bottom of the basin of the furnace, not being retained in contact with the wrought-scrap until the latter is ready to accompany it to the place of collection, but owing to its quantity trickling down through the fuel, eventually forming a cast-iron side to the loop, which will be shattered or broken by the hammer.

I am not able distinctly to determine the exact limit of size within which cast-scrap may be successively employed in this connection; nor do I consider it necessary, as the point of invention may be considered distinctly stated when I say that

I claim—

Combining cast-iron turnings, or other cast-iron scrap of sufficiently small size, with wrought-iron scrap or turnings to form an aggregated mass to be formed into a bloom by the hammer.

HENRY B. SEIDEL.

Witnesses:
DANIEL FARRA,
JOHN C. FARRA.